Aug. 2, 1966          B. D. MORGAN          3,263,680
SURGICAL OR VAGINAL DRAPE
Filed Sept. 18, 1964
FIG. 1
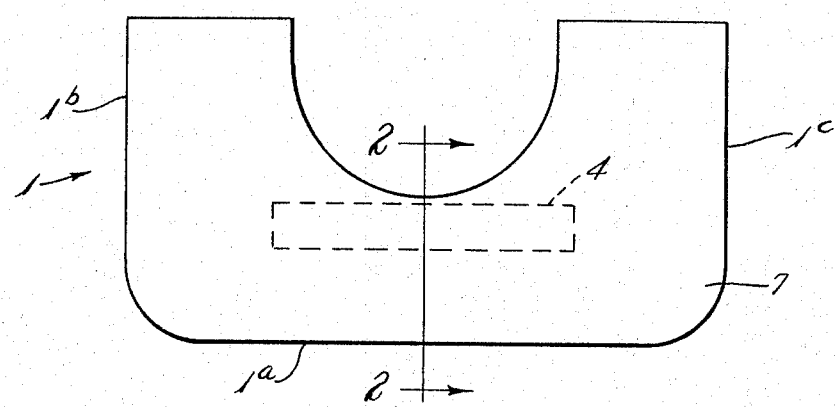
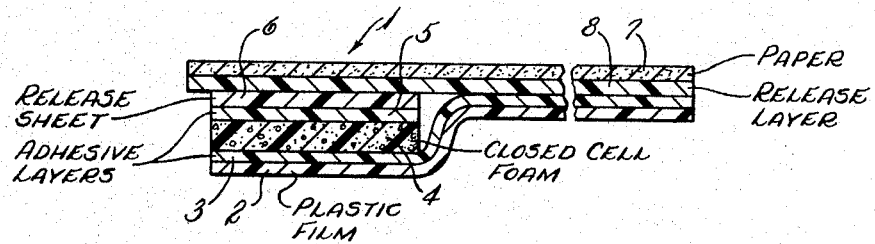
FIG. 2
INVENTOR.
BURTON D. MORGAN
BY Oldham & Oldham
ATTYS

United States Patent Office 3,263,680
Patented August 2, 1966

3,263,680
SURGICAL OR VAGINAL DRAPE
Burton D. Morgan, Hudson, Ohio, assignor to Morgan Adhesives Company, Stow, Ohio, a corporation of Ohio
Filed Sept. 18, 1964, Ser. No. 397,424
5 Claims. (Cl. 128—132)

The present invention relates to surgical drapes, and especially to vaginal drapes or bibs, particularly those adapted for use during obstetrical delivery, or vaginal surgery.

Heretofore there have been various types of laminates provided for use in shielding a portion of a patient's body while an operation is being performed on the patient, or while the patient is giving birth to a baby, or for other reasons.

The general problems in using surgical drapes, vaginal drapes and the like, are that they have been hard to apply, that they may not have sealed off an area of the patient's body tightly adjacent the point of surgery, or other medical action, or that they have been unsuitable for other reasons.

The general object of the present invention is to provide a novel and improved surgical or vaginal drape that is particularly adapted to form an intimate sealed contact with the patient's body adjacent an opening therein to seal a surface area of the patient's body from another portion of the body on which an operation is being performed or, for example, during obstetrical delivery.

A further object of the invention is to provide a closed cell resilient foam strip on a surgical drape or bib to facilitate obtaining a good sealed engagement between a liquid impervious surgical drape and the patient's body so as to attach the surgical drape tightly to the body during childbirth, or an operation, or at other times, as desired.

Another object of the invention is to provide an improved seal of a surgical drape to a patient by a closed cell resilient layer adjacent one margin of the drape.

The foregoing and other objects and advantages of the invention will be made more apparent as the specification proceeds.

Attention now is directed to the accompanying drawings where:

FIG. 1 is a plan view of a surgical or vaginal drape embodying the principles of the invention; and FIG. 2 is an enlarged vertical cross section taken on line 2—2 of FIG. 1.

When referring to corresponding members shown in the drawings and referred to in the specification, corresponding numerals are used to facilitate comparison therebetween.

Generally speaking, the present invention, as to one embodiment thereof, relates to a surgical or vaginal drape or the like comprising a thin flexible impervious plastic film, a layer of pressure sensitive adhesive covering one face of the film, a strip of closed cell resilient vinyl foam secured by one of its faces to the adhesive layer preferably adjacent one margin of the film to cover a local area thereof, a layer of pressure sensitive adhesive carried by the other face of the vinyl foam strip, a cover sheet releasably attached to the adhesive layer on the other face of the vinyl foam strip, and a cover layer releasably attached to the exposed area of the adhesive layer on the plastic film and extending over the cover sheet on the vinyl foam strip whereby the cover layer and the cover sheet can be removed to enable the plastic film and the foam strip to be attached firmly to even an irregular surface skin area or portion of a patient so as to seal off that portion of the patient's skin from the operative area.

Reference now is made to the details of the structure shown in the drawings, and a surgical or vaginal drape 1 is indicated. This surgical drape 1 or laminate, can be of any desired size, but in the embodiment shown, is of generally wide U-shape and it includes a thin, flexible, liquid impervious plastic film 2. This plastic film can be made from polyvinyl chloride, or other similar plastic resins. The film 2 has a layer of a conventional pressure sensitive adhesive 3 covering one face or surface of the film. The drape 1 has a base portion 1a and a pair of arm portions 1b and 1c.

It is an important feature of the invention that a strip 4, that is made of closed cell resilient plastic material, such as a vinyl foam, is secured by one of its faces or surfaces to the adhesive layer 3 preferably adjacent one margin of the film so as to normally cover a local area of the film 2. The drawing shows that this strip or layer 4 may be attached to the film 2 immediately adjacent the upper edge of the base portion 1a of this film 2 when of the U-shape shown.

The drawing shows that a layer 5 of conventional pressure sensitive adhesive is suitably secured to or provided on the other face of the foam strip 4. In order to protect this adhesive layer 5, a cover strip or sheet 6 usually is releasably attached to the adhesive layer 5. This cover sheet 6 may be made from a smooth surfaced plastic material, such as Mylar, which is one inert plastic that can be attached to the pressure sensitive adhesive layer 5, but yet be conveniently and easily removed therefrom. Or, if desired, the cover sheet 6 may be made from a fairly strong paper sheet or strip that has a suitable release layer, such as a layer of a polymerized silicone thereon, whereby the cover sheet still can be removed readily from the associated laminate when desired.

The surgical drape 1 of the invention is completed in this instance by a suitable paper cover sheet or layer 7, or equivalent, that has a conventional release layer 8 attached thereto so as to attach this paper cover 7 releasably to the entire exposed surface of the film 2 and to be adhered to the pressure sensitive adhesive layer 3 thereon. Such paper cover or sheet 7 also usually extends over the cover sheet 6 provided on the foam strip 4, and it may directly engage the adhesive layer 5 thereon, if desired.

By the novel and improved surgical drape of the invention, the paper cover sheet 7 or equivalent layer can be removed from the surface of the film 2, and the film 2 can be adhesively affixed in any desired manner, usually progressively, to the patient's body adjacent an opening therein or an area on which surgery is to be performed. By applying the film 2 tightly to the patient's body, and by pressing the resilient foam strip 4, after removal of the cover 6, against the body, even irregular surface skin portions can be intimately and directly bonded to the foam strip 4 for tight engagement therewith to prevent blood or other matter from flowing over the patient's body intermediate the body and the applied film and associated means, such as the strip 4. Thus the strip 4 will provide an effective seal or barrier to prevent blood or other matter from flowing over the patient's body adjacent an area on which surgery is being performed, or adjacent the vaginal opening during obstetrical delivery. Also, the film 2 and strip 4 prevent perspiration from the covered portion of the patient from reaching the surgical area.

It will be realized that this foam strip 4 can be made of any suitable size, but preferably is of a thickness of between about ½₂" and ¼". The films are shown of enlarged thicknesses in the drawings.

When applying the surgical drape 1 of the invention to a patient, the arm portions of the film 2 in the U-shape shown, could be applied to the backs of the patient's thighs and then the center portion of the film could be applied to the buttocks of the patient, and with the foam strip 4 being adapted to be positioned, for example, immediately adjacent the vaginal opening of the patient to form a seal or barrier immediately thereadjacent. Naturally the remaining portion of the base part of the film 2 would then be adapted to conform to the patient's legs and even to the rectal area, as desired, so as to cover such areas and prevent any contamination of the surgical area from adjacent parts of the patient's body.

When using the surgical drape or laminate of the invention, normally the entire laminate is sterlized after it is made. Thus, preferably the surgical drape is inserted into a package and the entire package assembly is then sterilized, as by exposure to ethylene oxide. The package then normally would be completely sealed and be distributed for use. The film 2 and the foam strip 4 are made from a material that will withstand the sterilization action used.

When using the surgical or vaginal drape of the invention, this drape preferably is positioned immediately adjacent the vaginal opening, and if desired, another drape member might be applied to the patient in other areas, as desired. In all events, the use of this drape will seal off areas of the patient's skin immediately adjacent the opening in the patient's body on which surgery or other action is being performed. Furthermore, the drape or laminate of the invention can be readily removed from the patient at the completion of the operation and it will have protected areas of the patient adjacent the surgical action to facilitate clean-up of the patient. The surgical darpe may be used where it is desired to seal one irregular surface portion of a patient's body effectively from an adjacent area of the body. Thus it is believed that an inexpensive but improved type of surgical drape has been provided and that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A surgical drape, vaginal bib or the like comprising a thin flexible plastic film,
a layer of pressure sensitive adhesive covering one face of said film,
a strip of closed cell resilient vinyl foam secured by one of its faces to said adhesive layer adjacent one margin of said film to cover a local area thereof,
a layer of pressure sensitive adhesive on the other face of said vinyl foam strip,
a cover sheet releasably attached to the said adhesive layer on the other face of said vinyl foam strip, and
a paper cover having a release layer thereon releasably attached to the exposed portion of said adhesive layer on said plastic film and extending over said cover sheet on said vinyl foam strip whereby said paper cover and said cover sheet can be removed to enable said plastic film and said foam strip to be attached to a patient.

2. A surgical drape, vaginal bib or the like comprising a thin flexible liquid impervious plastic film,
a layer of pressure sensitive adhesive covering one face of said film,
a strip of closed cell resilient foam material secured by one of its faces to said adhesive layer adjacent one margin of said film to cover a local area thereof,
a layer of pressure sensitive adhesive carried by the other face of said foam strip,
a cover sheet releasably attached to the said adhesive layer on the other face of said foam strip, and
a cover member releasably attached to the exposed area of said adhesive layer on said plastic film and to said cover sheet on said foam strip whereby said paper cover and said cover sheet can be removed to enable said plastic film and said foam strip to be attached to a patient.

3. A surgical drape, vaginal bib or the like comprising a thin flexible liquid impervious plastic film,
a layer of pressure sensitive adhesive covering one face of said film,
a strip of closed cell resilient foam material secured by one of its faces to said adhesive layer adjacent one margin of said film to cover a local area thereof,
a layer of pressure sensitive adhesive carried by the other face of said foam strip, and
a cover member releasably attached to the exposed area of said adhesive layer on said plastic film and to said foam strip whereby said paper cover can be removed to enable said plastic film and said foam strip to be attached to a patient.

4. A surgical drape, vaginal bib or the like comprising a U-shaped thin flexible plastic film having base and two arm portions,
a layer of pressure sensitive adhesive covering one face of said film,
a strip of closed cell resilient vinyl foam material secured by one of its faces to said adhesive layer adjacent the upper edge of the base portion of said film,
a layer of pressure sensitive adhesive carried by the other face of said vinyl foam strip,
a cover sheet releasably attached to the said adhesive layer on the other face of said vinyl foam strip, and
a second cover sheet releasably attached to the exposed area of said adhesive layer on said plastic film and extending over said cover sheet on said vinyl foam strip whereby said second cover sheet and said first-named cover sheet can be removed to enable said plastic film and said foam strip to be attached to a patient with said foam strip being adapted to be pressed into tight engagement with a patient immediately adjacent the vaginal opening and with the base and arm portions of the plastic film being engageable with the patient's buttocks and the backs of the patient's thighs.

5. A surgical drape, vaginal bib or the like comprising a U-shaped flexible plastic film having a base and two arm portions,
a layer of pressure sensitive adhesive covering one face of said film,
a strip of closed cell resilient foam material secured by one of its faces to said adhesive layer adjacent the upper edge of the base portion of said film,
a layer of pressure sensitive adhesive carried by the other face of said foam strip, and
a cover sheet releasably attached to the exposed area of said adhesive layer on said plastic film and to said foam strip whereby said cover sheet can be removed to enable said plastic film and said foam strip to be attached to a patient with said foam strip being adapted to be pressed into tight engagement with a patient immediately adjacent the vaginal opening and with the base and arm portions of the plastic film being engageable with the patient's buttocks and the backs of the patient's thighs.

References Cited by the Examiner

Vinyl Surgical Drapes, Modern Plastics, May 1951, page 61.

Whatever the Procedure, Annals of Surgery, September 1960, page 54.

ADELL M. EAGER, *Primary Examiner.*